(12) United States Patent
Wang et al.

(10) Patent No.: US 9,275,432 B2
(45) Date of Patent: Mar. 1, 2016

(54) METHOD OF, AND APPARATUS FOR, REGISTRATION OF MEDICAL IMAGES

(71) Applicants: Toshiba Medical Systems Corporation, Otawara-shi (JP); The University Court of the University of Edinburgh, Edinburgh (GB)

(72) Inventors: Chengjia Wang, Edinburgh (GB); Keith Goatman, Edinburgh (GB); Scott Semple, Edinburgh (GB)

(73) Assignees: Toshiba Medical Systems Corporation, Otawara-shi (JP); The University Court of the University of Edinburgh, Edinburgh (GB)

( * ) Notice: Subject to any disclaimer, the term of this patent is extended or adjusted under 35 U.S.C. 154(b) by 19 days.

(21) Appl. No.: 14/076,357

(22) Filed: Nov. 11, 2013

(65) Prior Publication Data

US 2015/0131880 A1    May 14, 2015

(51) Int. Cl.
*G06K 9/00*    (2006.01)
*G06T 3/00*    (2006.01)
*G06T 7/00*    (2006.01)

(52) U.S. Cl.
CPC ............. *G06T 3/0075* (2013.01); *G06T 7/0028* (2013.01); *G06T 2207/10081* (2013.01); *G06T 2207/10088* (2013.01); *G06T 2207/10104* (2013.01); *G06T 2207/10108* (2013.01); *G06T 2207/20061* (2013.01); *G06T 2207/30101* (2013.01)

(58) Field of Classification Search
CPC ...................................................... G06K 9/00
USPC ........................................................ 382/131
See application file for complete search history.

(56) References Cited

U.S. PATENT DOCUMENTS

| | | | | |
|---|---|---|---|---|
| 6,782,284 | B1 * | 8/2004 | Subramanyan et al. | ....... 600/407 |
| 2004/0082846 | A1 * | 4/2004 | Johnson et al. | ............... 600/410 |
| 2006/0058638 | A1 * | 3/2006 | Boese et al. | .................. 600/411 |
| 2006/0233430 | A1 * | 10/2006 | Kimura | ................ G06T 7/0024 |
| | | | | 382/128 |
| 2007/0092864 | A1 * | 4/2007 | Reinhardt et al. | ................. 435/4 |
| 2008/0249755 | A1 * | 10/2008 | Tek et al. | ........................ 703/11 |
| 2009/0225932 | A1 * | 9/2009 | Zhu et al. | .......................... 378/7 |
| 2010/0309198 | A1 * | 12/2010 | Kauffmann | .................... 345/419 |

(Continued)

OTHER PUBLICATIONS

Josu Maiora Oria, Computational Intelligence for Abdominal Aortic Aneurysm Imaging Analysis, 2012, ~.ehu.es/ccwintc.~go, pp. 1-135.*

(Continued)

*Primary Examiner* — Gregory F Cunningham
(74) *Attorney, Agent, or Firm* — Oblon, McClelland, Maier & Neustadt, L.L.P.

(57) ABSTRACT

An apparatus for registering medical image data representing a tubular structure comprises a data processing unit for obtaining first medical image data representing the tubular structure and second medical image data representing the tubular structure, a region identification unit for identifying the tubular structure in the first medical image data, defining in the first medical image data a volumetric region of interest comprising the tubular structure along the length of the tubular structure and defining a subset of the first medical image data corresponding to the region of interest, and a registration unit for performing a registration of the subset of the first medical image data with at least some of the second medical image data, wherein the registration comprises at least one of a rigid registration and an affine registration.

26 Claims, 11 Drawing Sheets

(56) References Cited

U.S. PATENT DOCUMENTS

| | | | |
|---|---|---|---|
| 2012/0215094 A1* | 8/2012 | Rahimian et al. | 600/414 |
| 2013/0094725 A1* | 4/2013 | Gulsun et al. | 382/128 |
| 2014/0212013 A1* | 7/2014 | Han | 382/131 |
| 2014/0294152 A1* | 10/2014 | Florent et al. | 378/62 |

OTHER PUBLICATIONS

Friston et al., Spatial Registration and Normalization of Images, 1996, Wiley-Liss, Retrieved frrom Internet on Apr. 21, 2015, Retreived from <URL:http://www.fil.ion.ucl.ac.uk/~karl/Spatial%20registration%20and%20normalization%20of%20images.pdf>.*

H. W. Kniemeyer, et al., "Treatment of Ruptured Abdominal Aortic Aneurysm, a Permanent Challenge or a Waste of Resources? Prediction of Outcome Using a Multi-organ-dysfunction Score", Eur. J. Vasc. Endovasc. Surg. vol. 19, Feb. 2000, pp. 190-196.

K. A. Vardulaki, et al., "Quantifying the risks of hypertension, age, sex and smoking in patients with abdominal aortic aneurysm", British Journal of Surgery 2000., 2000, vol. 87, pp. 195-200 plus two additional pages.

Teun B. M. Wilmink, et al., "The influence of screening on the incidence of ruptured abdominal aortic aneurysms", Journal of Vascular Surgery, vol. 30, No. 2, Aug. 1999, pp. 203-208.

Jennifer M. J. Richards, et al., "Abdominal Aortic Aneurysm Growth Predicted by Uptake of Ultrasmall Superparamagnetic Particles of Iron Oxide: A Pilot Study", Circulation Cardiovascular Imaging, 4 (3), Feb. 8, 2011, pp. 274-281.

Josu Maiora Oria, Computational Intelligence for Abdominal Aortic Aneurysm Imaging Analysis, 2012, http://www.ehu.es/ccwintco, pp. 1-135.

* cited by examiner

METHOD OF, AND APPARATUS FOR, REGISTRATION OF MEDICAL IMAGES

FIELD

Embodiments described herein relate generally to a method of, and apparatus for, registering medical image data, for example a method and apparatus for registering tubular structures in medical image data.

BACKGROUND

In the field of medical imaging, medical images are often required to be aligned for comparison. For example, a current image of a patient may be aligned with a prior image of the same patient to assess disease progression or results of treatment.

It is known to compare or combine images that have been obtained using different modalities of imaging, for example X-ray computed tomography (CT) and magnetic resonance imaging (MR), to take advantage of the different information that is obtained from scans in each modality. Different modalities may provide different levels of contrast detection for different tissue types. Some regions, tissues or anatomical features may show up more on CT than on MR or vice versa. CT scans may be better for anatomical information while MR scans may be better for softer tissues and for functional information.

However, in general, the position of anatomical features will differ between different images, for example due to different patient positioning, patient movement, different modalities of imaging or different imaging parameters. Therefore images must be aligned for comparison. Alignment may refer to any way of mapping two image data sets together, including manual alignment, mechanical alignment or alignment by registration, for example by using registration software.

In order to achieve accurate alignment of two images of a given anatomical feature, it is necessary to transform one of the images so that the coordinates of the anatomical feature are the same in each resulting image. This is achieved by the process of image registration and transformation.

Rigid registration refers to a class of techniques for aligning two or more images or volumes by way of rigid transformations (transformations that involve only rotation and translation parameters). Affine registration is a registration using affine transformations (rotation, translation, scaling, or shearing).

For image registration, it is sometimes useful to use rotation, translation, and a uniform scaling component. This gives a space of transformations that is more general than rigid transformations, but not as general as affine transformations.

Non-rigid registration refers to a class of techniques that use more general transformations that allow for deformation, including local deformation.

Techniques for registration of images are well-known. In general, registration is an optimization problem, with the aim of finding an optimal transform between two images, which relates corresponding features in the images by mapping points in the coordinate system of one image onto the corresponding points in the coordinate system of the other image.

A similarity measure is a measure of the similarity between two images. For example, in the mutual information (MI) approach, points in each image are identified and correlated by the statistical similarity (mutual information) between the two images.

For registration of two images, one image may be kept constant and the other transformed according to a set of parameters defined by the type of registration (for example, in rigid registration, rotation and translation parameters in the appropriate number of dimensions). The similarity measure between the two resulting images is then determined. This defines an objective function from the parameters to the similarity measure. The objective function is then optimized using an optimization function, for example, gradient descent, hill climbing or Powell optimization, to achieve an optimal transform relating the two images. This optimal transform is applied to the second image to obtain a transformed image that is aligned with the first image, and has a common coordinate system.

Registration can be performed manually (for example, by manual selection of corresponding points on each image), semi-automatically, or automatically. Many medical imaging systems now have greater automation of registration than was previously the case.

Results of automatic registration may be evaluated by comparison to validation data (which may also be called ground truth), for example by comparison to the results of manual registration that has been performed by a clinical expert.

It is of interest to register tubular structures in the body, for example blood vessels. One motivation for registering blood vessels is to compare images of blood vessels that were taken at different times to assess the progress of diseased vessels, for example those having stenosis or aneurysm. In such comparisons, it is important that the vessel is registered correctly so that the vessels may be accurately compared, but it is also important that the registration process does not remove changes in the vessel that may result from disease.

An abdominal aortic aneurysm (AAA) is a ballooning of the aorta due to weakness in the vessel wall. In patients having an AAA, there is a risk of aneurysm rupture, which is fatal in 65% to 85% of cases (Kniemeyer et al. Eur J Vasc Endovasc Surg 2000; 19:190-196). In 2000 there were approximately 6800 deaths from AAA rupture in England and Wales alone (Vardulaki et al. Br J Surg 2000; 87:195-200). In men over 65, AAA rupture is responsible for 2.1% of all deaths (Wilmink et al. J Vasc Surg 1999; 30:203-8). AAAs are usually completely asymptomatic prior to rupture. Many AAAs may be detected coincidentally when a medical image of the patient is taken for another medical purpose.

Ultrasound examination may be the modality of choice for screening for AAAs. Under current medical practices, if a patient is found to have an MA, the patient may undergo ultrasound surveillance at periodic intervals, for example at 6 month, 12 month or 24 month intervals. Each ultrasound surveillance scan may result in a single value for the diameter of the aneurysm. It may be difficult to measure the same aneurysm diameter on each scan. For example the diameter may be measured at different angles on different scans.

At present, surgical review may be based on the size of the aneurysm. For example, only patients having an aneurysm diameter of 5.5 cm or greater may be scheduled for surgery. However, it has been found that the size of the aneurysm may not necessarily be a good indicator of the likelihood of aneurysm rupture. Some aneurysms may rupture when below 5.5 cm in diameter. Some aneurysms may reach 10 to 12 cm in diameter without rupturing.

In patients known to have an aneurysm, more invasive follow-up may be justified to determine those patients who are most at risk of rupture. Acquiring more detailed imaging data for such patients may improve knowledge of factors that may cause the aneurysm to rupture. For example, it may be possible to analyze the composition of the aneurysm.

Such follow-up may include studies using imaging modalities such as MR and CT, or other modalities. Multimodality scans may be performed to get different information from each modality. For example, when imaging an AAA, as the scan moves through the thrombus, some areas may show up more on CT, while others show up more on MR.

Scans of different modalities may be taken at the same time, for example on the same day. Alternatively, images of the same or different modality may be taken as part of a longitudinal study, where images are taken over a period of time, for example images are taken on different days, weeks or months. Longitudinal follow-up aims to detect changes in the form of the aneurysm with time. Longitudinal follow-up by MR or CT is likely to benefit from accurate image registration.

Standard clinical care of patients whose aneurysms are being monitored may require either MR or CT alone. However, one current scanning protocol is to take two MRI scans a day apart, the second of which has a contrast agent that targets inflammation, and also to take a CT scan first day. Imaging that uses USPIO (ultrasmall superparamagnetic iron oxide) contract agents may be performed in this manner.

The abdomen is non-rigid. Different organs and structures within the abdomen move independently of each other. A single rigid registration cannot therefore correct accurately for motion in the abdomen.

However, using a non-rigid registration algorithm on the abdomen (including the abdominal aorta) without any further constraints may mask genuine changes in an AAA. The non-rigid registration will match the form of the aneurysm between the images being registered and thus a change in the aneurysm may no longer be distinguishable after registration.

Similar considerations may also apply to aneurysms occurring in other parts of the body, for example in the heart, or to other medical conditions, for example stenosis, that may occur in tubular structures such as the arteries.

One method that has been proposed for registering the aorta proposes to register two computed tomography angiography (CTA) images of an aorta by first segmenting the aorta from each image and then registering the two objects that result from the segmentation using manual registration.

BRIEF DESCRIPTION OF THE DRAWINGS

Embodiments are now described, by way of non-limiting example, and are illustrated in the following figures, in which.

DETAILED DESCRIPTION

Certain embodiments provide an image processing apparatus for registering medical image data representing a tubular structure, comprising a data processing unit for obtaining first medical image data representing the tubular structure and second medical image data representing the tubular structure, a region identification unit for identifying the tubular structure in the first medical image data, defining in the first medical image data a region of interest comprising the tubular structure along at least part of the length of the tubular structure and defining a subset of the first medical image data corresponding to the region of interest, and a registration unit for registering the subset of the first medical image data with at least some of the second medical image data.

Figure 1:
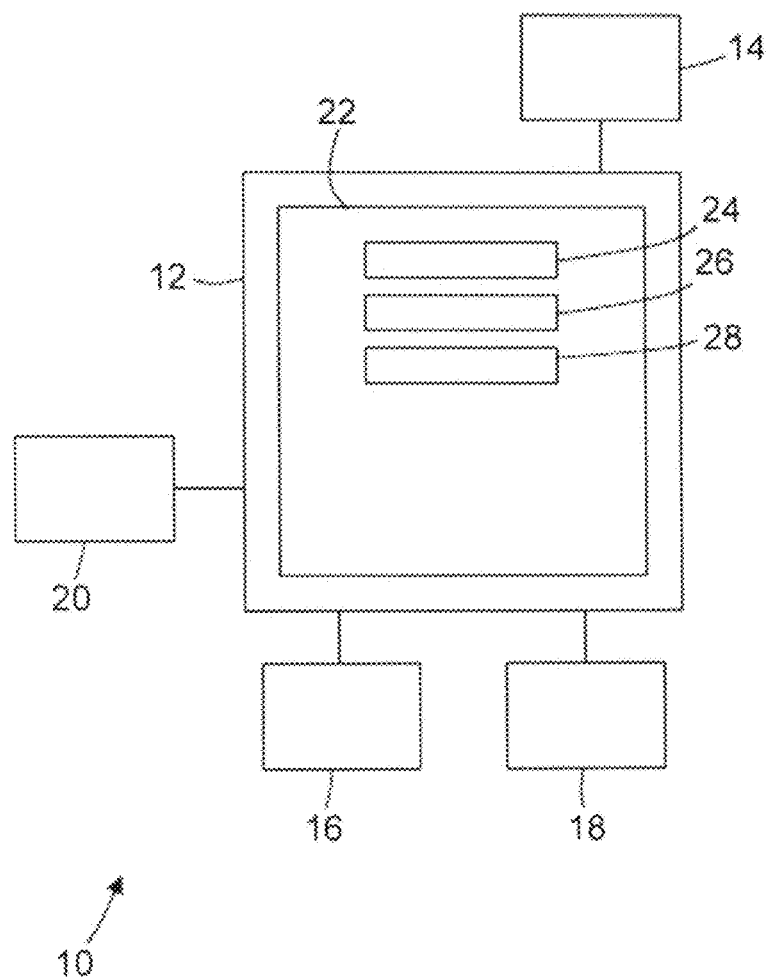
FIG. 1 is a schematic diagram of an image processing system according to an embodiment.

An image processing apparatus 10 according to an embodiment, which is configured to register two images of a tubular structure, is illustrated schematically in FIG. 1. In the present embodiment, each set of data comprises CT data. In alternative embodiments, one or both of the sets of data comprises any appropriate medical image data, for example MR, PET, SPECT or X-ray data. Medical may include veterinary.

The image processing apparatus 10 comprises a computing apparatus 12, in this case a personal computer (PC) or workstation, that is connected to a CT scanner 14, a display screen 16 and an input device or devices 18, such as a computer keyboard, mouse or trackball. In alternative embodiments, at least one display screen 16 is a touch screen, which also acts as the input device 18. In the present embodiment, the CT scanner is one of the Toshiba Aquilion® range of CT scanners. The CT scanner 14 may instead be any CT scanner that is configured to obtain three-dimensional image data. In alternative embodiments, the CT scanner is replaced or supplemented by a scanner that supports another modality of imaging, for example an MRI scanner, X-ray scanner or PET scanner.

In the present embodiment, sets of image data obtained by the CT scanner 14 are stored in memory unit 20 and subsequently provided to computing apparatus 12. In an alternative embodiment, sets of image data are supplied from a remote data store (not shown), which may form part of a Picture Archiving and Communication System (PACS). The memory unit 20 or remote data store may comprise any suitable form of memory storage.

The computing apparatus 12 provides a processing resource for automatically or semi-automatically processing sets of image data. Computing apparatus 12 comprises a central processing unit (CPU) 22 that is operable to load and execute a variety of software modules or other software components that are configured to perform the method that is described below with reference to FIG. 2.

The computing apparatus 12 includes a data processing unit 24 for obtaining medical image data, a region identification unit 26 for obtaining subsets of the medical image data, each subset corresponding to a region of interest defined in relation to the tubular structure, and a registration unit 28 for registering the subsets of the medical image data.

In the present embodiment, the data processing unit 24, region identification unit 26 and registration unit 28 are each implemented in the computing apparatus 12 by means of a computer program having computer-readable instructions that are executable to perform the method of the embodiment. However, in other embodiments, each unit may be implemented in software, in hardware or in any suitable combination of hardware and software. In some embodiments, the various units may be implemented as one or more ASICs (application specific integrated circuits) or FPGAs (field programmable gate arrays). In further embodiments, one or more units may be implemented on a GPU (graphics processing unit).

The computing apparatus 12 also includes a hard drive and other components of a PC including RAM, ROM, a data bus, an operating system including various device drivers, and hardware devices including a graphics card. Such components are not shown in FIG. 1 for clarity.

Figure 2:
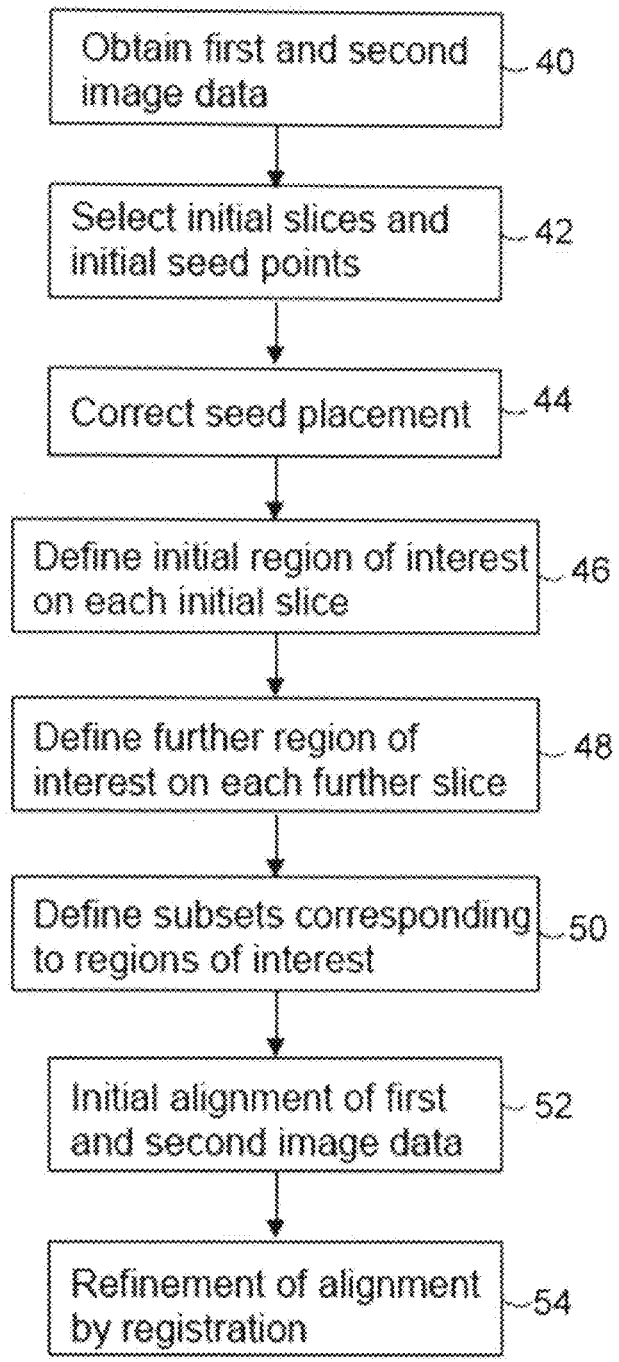
FIG. 2 is a flow chart illustrating in overview a mode of operation of the embodiment of FIG. 1.

The system of FIG. 1 is configured to perform a process having a series of stages as illustrated in overview in the flow chart of FIG. 2.

At stage 40, the data processing unit 24 obtains a first set of medical image data and a second set of medical image data from the memory store 20 or from a remote data store, or from the scanner 14 directly. The first set of image data and the second set of image data represent the same tubular structure. Each set of image data represents the tubular structure and tissue that is adjacent to the tubular structure. The sets of image data may have been taken on the same day, or on different days (for example, as part of a longitudinal study).

In the present embodiment, the tubular structure that is represented by the first image data and the second image data is the abdominal aorta. In alternative embodiments, the tubular structure may be another blood vessel, for example the thoracic aorta. The tubular structure may be a blood vessel having plaque or aneurysm. In further embodiments, the tubular structure may be the heart.

In the present embodiment, each of the sets of image data is volumetric data from a CT scan. The volumetric data comprises a series of two-dimensional image slices which together make up a three-dimensional image data set. Each image slice is made up of a plurality of voxels, each voxel comprising an intensity value and each voxel having a set of co-ordinates (for example, x, y, z coordinates) representing the spatial position for which the intensity value for that voxel was measured in a chosen co-ordinate system (for example, a Cartesian coordinate system). In further embodiments, one or both of the sets of image data is from a scan in any modality that may represent three-dimensional image information, for example MRI data, PET data, SPECT data or X-ray data.

In the present embodiment, the first image data comprises slices that were taken along the length of the abdominal aorta from the top of the aorta to the bifurcation of the aorta. When performing a registration process such as the process of FIG. 2, it is desirable that a healthy part of the tubular structure is included in addition to any section which is diseased or suspected to be diseased. It is possible to add extra slices to the image to include, for example, branch points, the renal arteries and the bifurcation of the aorta. It may be desirable to have reference points or landmarks. Bifurcation points in general do not move, and so may be suitable reference points or landmarks.

In the present embodiment, the first set of image data and the second set of image data have the same resolution. In further embodiments, for example where the first set of image data and second set of image data are taken in different modalities, the sets of image data have different resolutions. For example, MR images may have a different voxel resolution to CT images. If the two sets of image data have different resolutions, the data processing unit 24 may scale one set of image data to match the resolution of the other set of image data, with further stages in the process of FIG. 2 being performed on the scaled image data.

As the first set of image data and second set of image data are intended to undergo registration, they may also be referred to as a reference image and a floating image. Either the first set of image data or the second set of image data may be the reference image, with the other of the first set of image data and second set of image data being the floating image.

Figure 3:
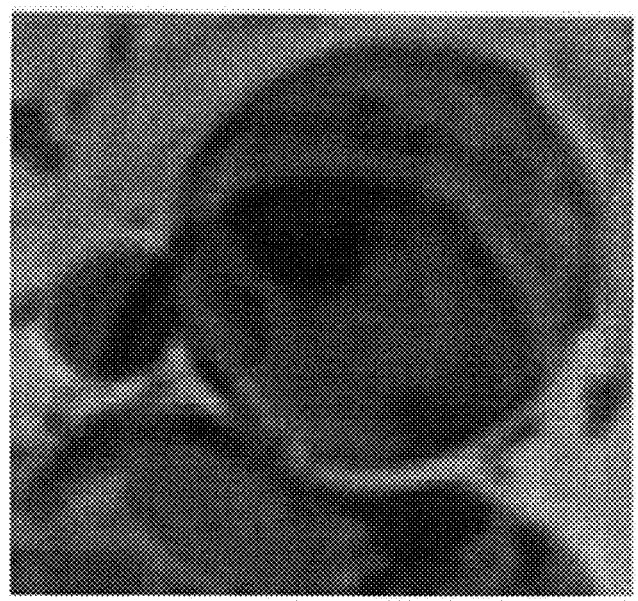
FIG. 3 is an image of an overlaid pair of images of the aorta that have not experienced any alignment or registration.

FIG. 3 shows an overlaid pair of images of the aorta that have not experienced any alignment or registration.

At stage 42, for each set of image data, the region identification unit 26 obtains an initial seed point within the lumen of the tubular structure, in this case within the lumen of the abdominal aorta.

In the present embodiment, a user selects an initial slice of the first set of image data on which to select the initial seed point. The initial slice may be any slice of the first image data. In the present embodiment, the first image data comprises slices that were taken along the length of the abdominal aorta from the top of the aorta to the bifurcation of the aorta. In the present embodiment, the user selects an initial slice that is approximately halfway along the length of the abdominal aorta.

In further embodiments, the user may select the initial slice on which to select the initial seed point based on the position of the slice in the tubular structure, the position of the slice in the three-dimensional image, or any other suitable criterion. In some embodiments, the user may select the initial slice based on characteristics of the image, for example by comparing two or more slices and selecting the slice on which the aorta appears clearest or roundest.

In the present embodiment, the selected initial slice is displayed as an image on display screen 16 and the user selects a point within the lumen of the aorta using input device 18, for example by clicking a point with a mouse. The region identification unit 26 designates the selected point as the initial seed point. In some embodiments, the region identification unit 26 designates the voxel on which the seed point has been placed as the initial seed point. In other embodiments, the region identification unit 26 designates a small group of voxels as the initial seed point. In further embodiments, more than one initial seed point may be designated.

The user then selects an initial slice of the second image data on which to select an initial seed point for the second image data. Again, the initial slice may be any slice of the image data. In the present embodiment, the initial slice of the second image data is again chosen to be about halfway along the length of the abdominal aorta. It is not necessary that the initial slice for the second image data corresponds to the initial slice that was selected for the first image data. For example, it is not required that the initial slices for the first and second image data represent the same position in the body. Any slice in the second image data may be chosen, independent of the choice of the initial slice for the first image data. Initial seed points chosen on both reference and floating images are not necessarily placed on the corresponded slices.

The user selects an initial seed point on the initial slice that was selected for the second image data. In the present embodiment, the user selects the initial seed point on the second image data in the same method as the initial seed point on the first image data was selected, that is, by clicking a point on the initial slice with a mouse. In other embodiments, any other suitable point selection method may be used for selecting one or both of the initial seed points, for example by using keyboard commands, a trackball, or a touch screen.

Figure 4:
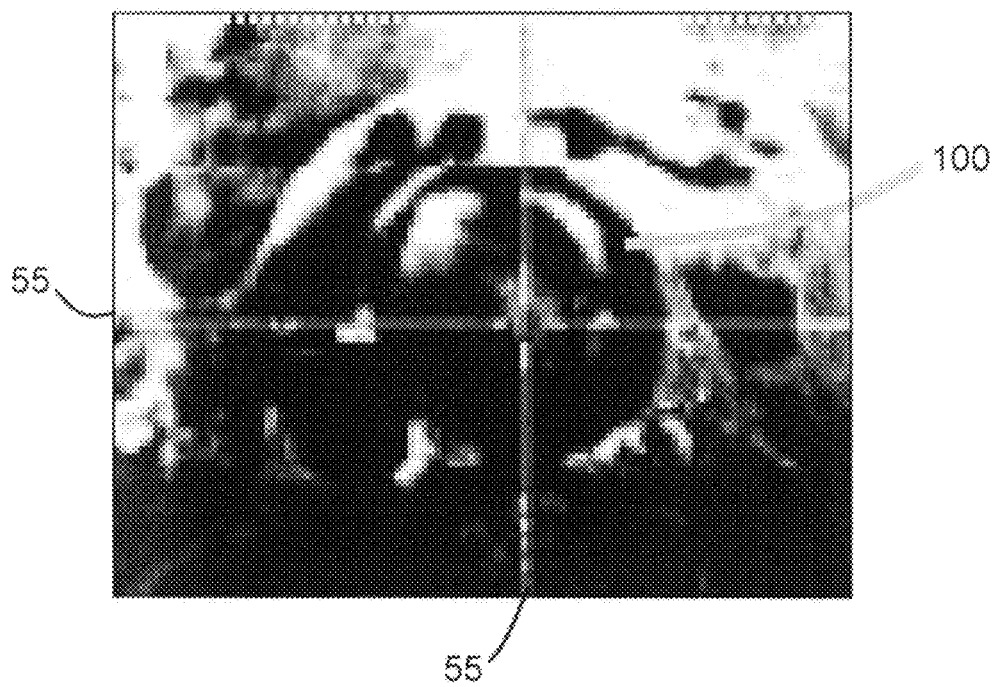
FIG. 4 shows an image slice on which the user may identify the center point of the aorta.

FIG. 4 shows an image slice on which the user may identify the center point of the aorta 100 by positioning the crosshairs 55 shown on the image.

At stage 44, the region identification unit 26 corrects each initial seed point that was identified by the user by centering the seed point within the aorta using an automatic refinement process. In the present embodiment, for each of the first and second image data, the region identification unit 26 centers the seed point within the aorta on the respective initial slice.

In the present embodiment, the region identification unit 26 uses a circular Hough transform to identify the aorta in the image data for the initial slice. In other embodiments, an alternative method of circle detection may be used. The region identification unit 26 uses the knowledge that the initial seed point was placed inside the lumen of the aorta and the fact that the aorta is roughly circular. Having recognized an approximate circle that corresponds to the aorta, the region identification unit 26 then selects a point at the center of that approximate circle as the corrected seed point. The center of the approximate circle may be determined by the circular Hough transform or by any other method. In other embodiments, the center of the approximate circle is determined using a probability density model, a blob feature detection method, an edge detection method, a genetic algorithm or any suitable classifier or feature detection strategy.

In further embodiments, the region identification unit 26 identifies the aorta based on a user input. For example, the user may outline the aorta manually or may position a circle on the aorta in the image.

Figure 6:
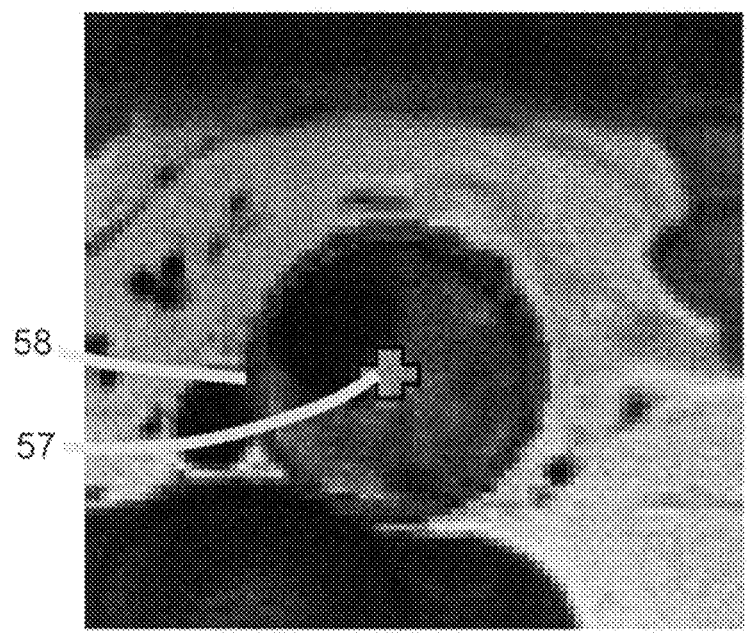
FIG. 6 is an image on which an approximate circle and center point have been defined.

FIG. 6 shows an image slice on which a corrected seed point is marked with a cross 57 in the center of an approximate circle 58 that has been identified using a circular Hough transform. The approximate circle 58 is marked over the boundary of the aorta.

In further embodiments, stage 44 is omitted and the region identification unit 26 uses the user-identified initial seed point for each set of image data in later stages of the process of FIG. 2.

In an alternative embodiment, instead of the user selecting the initial seed points at stage 42, each initial seed point is selected automatically by the region identification unit 26. In one embodiment, for each of the sets of image data, the region identification unit 26 selects an initial slice representing a position approximately halfway along the abdominal aorta. The region identification unit 26 uses a circular Hough transform to identify the aorta in the image of the slice, using the fact that the aorta is roughly circular. The region identification unit 26 may also use further information in the image slice data to assist in locating the aorta, for example by using one or more of the likely size of the aorta in the image slice, the likely position of the aorta in the image slice, the location of other anatomical features or tissue types in the image slice, or any other suitable information. In alternative embodiments, the region identification unit 26 identifies the aorta using a probability density model, a blob feature detection method, an edge detection method, a genetic algorithm or any suitable classifier or feature detection method.

Having recognized an approximate circle that corresponds to the aorta, the region identification unit 26 then selects a point at the center of that circle (as determined by the circular Hough transform or by any other method) as the initial seed point. In such an embodiment in which the initial seed point is automatically obtained by the region identification unit 26, the initial seed point may not require correction to center it in the aorta, and therefore stage 44 may be omitted and the initial seed point used as the corrected seed point in subsequent stages.

Other alternative methods of seed selection may be used, for example when the process is applied to a different tubular structure. Alternative methods may be manual or automatic, and may or may not include a correction stage 44.

In alternative embodiments, the initial seed point may be selected from any appropriate view of each set of image data, for example from a view in which a three-dimensional volume is rendered, or from any cross-section through such a volumetric image, not just from one of the two-dimensional slices as obtained by the scanner. More than one initial seed point may be selected. Initial seed points may be manually or automatically selected on more than one slice. The selection of an initial seed point may comprise the selection of a group of voxels or region of voxels.

In alternative embodiments, the tubular structure may be identified in any suitable manner, which is not limited to circle recognition on a slice or slices. As post-enhanced images usually give much higher intensity values to a blood vessel than to the surrounding tissue, in some embodiments simple thresholding methods together with placing limits on the location of the blood vessel within the image may allow a target blood vessel to be located. In some embodiments, the tubular structure may be segmented in the image data. Any suitable known segmentation method may be used. In the case where segmentation is used, the information within the segmented area may be used rather than the contour of the segmentation. Using the contour may limit the accuracy of registration with respect to the accuracy of segmentation.

At stage 46, for each of the sets of image data, the region identification unit 26 generates an initial region of interest around the corrected seed point (the seed point that has been centered in the aorta lumen) on the initial image slice. The region of interest in this case is a region that approximately contains the necessary information on the object to be included (the aorta lumen) and excludes most information that is not useful. In the present embodiment, the region identification unit 26 defines a square region of the image slice that is centered on the corrected seed point as the initial region of interest. The size of the square region is such that the square region includes all of the part of the image that represents the aorta.

In the present embodiment, the size of the square region is defined based on the resolution of the image and the largest aorta dimension that is shown on the initial slice. For example, the resolution of the image may be x mm/pixel and the largest dimension of the aorta may be Y mm. In this case the initial region of interest is a square having a side that is Y/x pixels in length.

In further embodiments, the user may define the size of the square region by observing different axial slices and directly finding a suitable size of a certain number of pixels for the region of interest. In other embodiments, the size of the region is determined automatically and/or the region is identified automatically.

Figure 5:
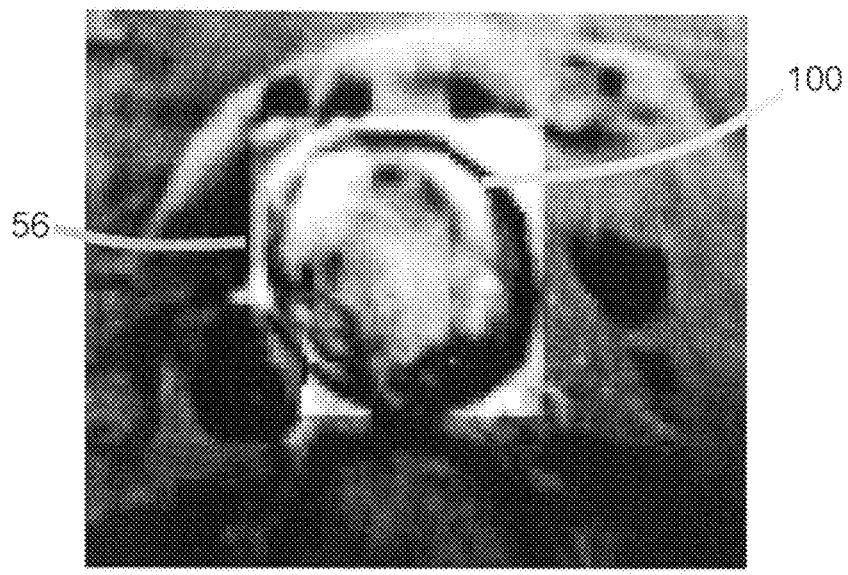
FIG. 5 is an image showing a region of interest.

FIG. 5 shows an image slice on which a region of interest 56 has been defined. The region of interest 56 is the square that is lighter than the rest of the image and contains the aorta 100.

In other embodiments, the shape of the region that is defined as the initial region of interest may not be a square.

The shape of the defined region may be, for example, a circle, a rectangle, an ellipse, a polygon, or any other suitable two-dimensional shape. The shape of the defined region may be decided by the shape of the tubular structure that is to be registered. In some embodiments, the shape of the defined region may be a shape corresponding to the shape of the tubular structure. The region identification unit 26 takes the defined square region to be the initial region of interest on the initial slice. Voxels that lie within the square region may be flagged as being part of the initial region of interest on the initial slice. Voxels that lie outside the square region may be flagged as not being part of the initial region of interest.

At stage 48, for each set of image data, the region identification unit 26 uses the initial region of interest that was identified on the initial slice containing the corrected seed point to identify further regions of interest on the further slices of the set of image data.

In the present embodiment, the region identification unit 26 first selects a slice that is adjacent to the initial slice. The region identification unit 26 then chooses a region of interest in the adjacent slice by matching the appearance of the region of interest on the initial slice. The region identification unit 26 performs a matching procedure using any suitable matching algorithm, for example a matching algorithm that matches the voxel intensities of the initial slice with the voxel intensities of the adjacent slice. In the present embodiment, the region identification unit 26 performs a rigid registration of the initial slice and the adjacent slice using a mutual information similarity measure. Since each of the slices is two-dimensional, registering the initial slice and the adjacent slice requires only one rotation and one translation. The region identification unit 26 maps the initial region of interest from the initial slice onto the adjacent slice, thereby determining a further region of interest on the adjacent slice. The region identification unit 26 also determines a reference point on the adjacent slice which corresponds to the corrected seed point of the initial slice. The reference point is at the center of the region of interest that has been defined on the adjacent slice.

The region identification unit 26 then refines the reference point on the adjacent slice, to center the reference point within the aorta as represented on the adjacent slice. In the present embodiment, the reference identification unit 26 centers the reference point using a circular Hough transform, in a similar manner to the correction of the initial seed point at stage 44. The centered reference point may be referred to as a corrected reference point.

After the reference point is corrected, the position of the region of interest on the adjacent slice is adjusted in accordance with the correction of the reference point, to center the region of interest on the corrected reference point. In further embodiments, an initial seed point is obtained for the adjacent slice, for example by user selection, and the region of interest for the adjacent slice is obtained by the method of stage 42 and stage 44 without matching with the initial slice.

The process described above for obtaining a region of interest and corrected reference point for the adjacent slice is repeated for each of the remaining further slices that make up each set of image data. For example, a region of interest and corrected reference point for the slice that is next to the adjacent slice and is not the initial slice are determined by matching that slice to the adjacent slice. The process is then repeated for the next slice. The initial region of interest is thereby propagated to the further slices. Each slice on which a region of interest has been determined may be used to determine a region of interest on any neighboring slice. The process may be referred to as region-growing by template matching.

The output of stage 48 is, for each set of image data, an initial region of interest on the initial slice and further regions of interest on the further slices, plus a corrected seed point on the initial slice and corrected reference points on the further slices. The set of points that includes the corrected seed points and corrected reference points is used as a set of vessel center points in stage 52. In the general case of any tubular structure, the set of points that includes the corrected seed points and corrected reference points is used as a set of center points of the tubular structure, with the set of center points being defined along the length of the tubular structure. In further embodiments, any appropriate set of points may be determined along the length of each tubular structure, which may not necessarily be center points. Each point may comprise a single point within the co-ordinate system, a voxel within the set of image data, a group of voxels within the set of image data, or any other appropriate data item.

Figure 7:
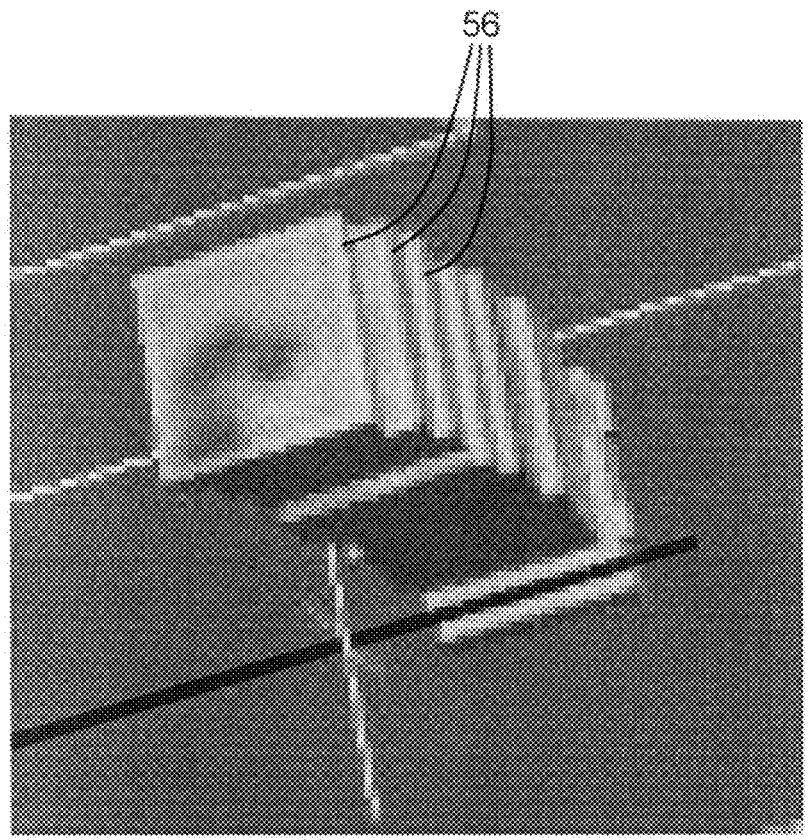
FIG. 7 is a schematic representation of a set of regions of interest.

FIG. 7 represents schematically the regions of interest 56 that have been established for each image slice.

In the present embodiment, the correction of seed points is integrated in the tracking process. On each slice, after the region of interest is tracked and the seed point is generated, the seed point is corrected based on the circle detection results.

In other embodiments, circle detection and the correction of seed point or reference point locations may be performed in any suitable order, as the processes of circle detection and correction of seed points or reference points may not be computationally expensive.

In one embodiment, a corrected seed point is obtained on the initial slice, an initial region of interest is generated, and the initial region of interest is then tracked on the further slices to obtain the further regions of interest. In such an embodiment, the location of the seed point may only be corrected on the initial slice and not on the further slices.

In another embodiment, an initial seed point is obtained on the initial slice, and an initial region of interest is centered on the initial seed point. Reference points are then obtained on some or all of the other slices by tracking the region of interest on further slices. The initial seed point and the reference points may then be corrected either together or independently after the tracking of the regions of interest has been completed. In alternative embodiments, vessel center points may be found by any suitable vessel tracking algorithm. A vessel center line may be tracked and the vessel center lines matched or registered to each other.

Figure 8:
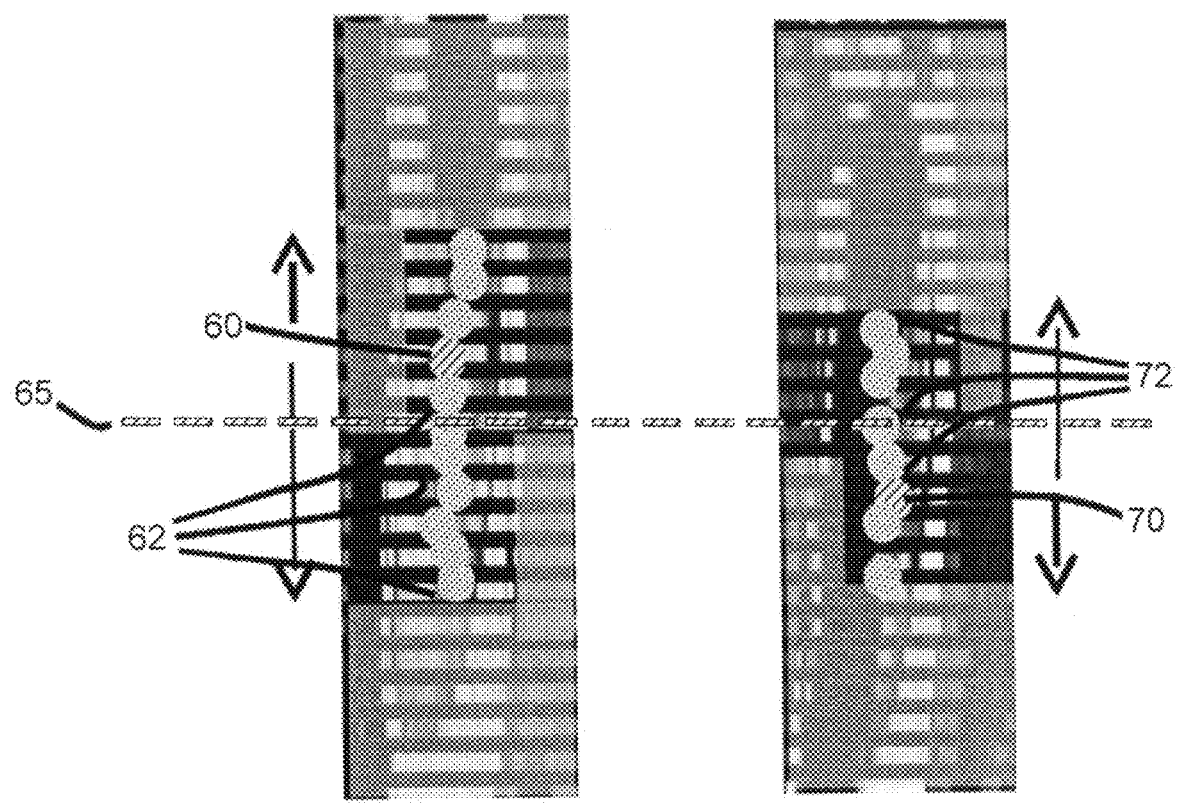
FIG. 8 is a schematic representation of two sets of vessel center points.

FIG. 8 represents a moment in time during the tracking process of stages 42 to 48. It shows the vessel center points that have been identified for a first set of image data (left) and a second set of image data (right). At the stage of the process that is represented in FIG. 8, vessel center points have been determined on some but not all of the scan slices. The slices for which vessel points have not yet been determined are masked (greyed out) in FIG. 8.

On the first set of image data, a corrected seed point 60 has been determined for a first slice that is near the middle of the set of slices but is not the middle slice (the middle slice is slice 65, indicated by a dotted line). In other embodiments, seed point 60 may be the initial seed point instead of the corrected seed point, if correction is performed after the propagation of the regions of interest.

Corrected reference points 62 have been determined for a number of slices to either side of the initial slice (those slices that are not greyed out). In the present embodiment, reference points 62 can be determined by tracking on either side of the initial slice at the same time, for example by using parallel computing techniques. In alternative embodiments, reference points 62 may be determined for all slices on one side of the initial slice first, followed by determination of reference points for the slices on the opposite side.

On the second set of image data, a corrected seed point 70 has been determined on an initial slice and corrected reference points 72 have been determined for a number of slices on each side of the initial slice. It may be noted that the corrected seed point 60 in the first set of image data and the corrected seed point 70 in the second set of image data are not on corresponding slices. The dotted line 65 across the center represents the middle slice as measured along the length of the aorta.

In alternative embodiments, the tracking of the reference points (generating the reference points from the initial seed point by propagating the region of interest) may be performed on an interpolated volume in which one or more additional slices are interpolated between each adjacent pair of scan slices. Such interpolation may increase the robustness of the tracking.

The regions of interest that are defined for the individual slices may be referred to as planar regions of interest. In the present embodiment, the region identification unit 26 defines a volumetric region of interest for each set of image data. For each set of image data, the volumetric region of interest is a combination of all of the planar regions of interest that were defined on the individual slices. In other embodiments, the volumetric region of interest for each set of image data is a combination of the planar regions of interest from a subset of the slices in the image. The volumetric region of interest comprises the tubular structure and any additional tissue that is included within the regions of interest. In the present embodiment, the planar regions of interest are square and the volumetric region of interest comprises the approximately circular aorta and any other tissue that is contained within the square planar regions of interest.

At stage 50, for each set of image data, the region identification unit 26 defines a subset of the volumetric image data where the subset comprises all voxels that fall within the volumetric region of interest (that is, all voxels that are within the region of interest of their respective slice). For each slice of the image data, the voxels that are flagged as being part of the square region of interest are included in the subset and those that are not part of the square region of interest are excluded from the subset.

In alternative embodiments, the voxels in each region of interest may be added to the appropriate subset at the same time as each region of interest is defined in stages 46 and 48.

The output of stage 50 is a volumetric subset of each set of image data. Given that each planar region of interest includes the aorta and some of the surrounding tissue as represented on its respective slice, each volumetric region of interest and corresponding subset of data includes all of the aorta that is represented in the set of image data plus some of the tissue that borders the aorta.

Although in the present embodiment, each volumetric region of interest surrounding the aorta and each corresponding subset of the image data is calculated semi-automatically from respective user-defined seed points (one on each set of image data), complete automation is feasible.

In further embodiments, the tubular structure is segmented and a volumetric region of interest is defined around the length of the segmented tubular structure. The subset is then defined as the voxels that fall within the volumetric region of interest around the tubular structure.

At stage 52, the registration unit 28 performs an initial alignment of the first set of image data and the second set of image data. Any suitable method of alignment may be used, including registration methods.

In the present embodiment, the registration unit 28 uses the sets of vessel center points that have been obtained for each set of image data from stage 46. The registration unit 28 considers each set of vessel center points as a point cloud. The registration unit 28 uses an iterative closest point (ICP) search to rigidly transform the point clouds of vessel center points and match the point cloud from the first set of image data with the point cloud from the second set of image data. The ICP search is based on the least square distance error. The ICP search iteratively revises a transformation between the point clouds until the distance between the point clouds is minimized. The transformation is a rigid transformation comprising a translation and a rotation. An advantage of using ICP is that it is a rapid and computationally efficient process to achieve an approximate alignment between the two images.

Figure 9:
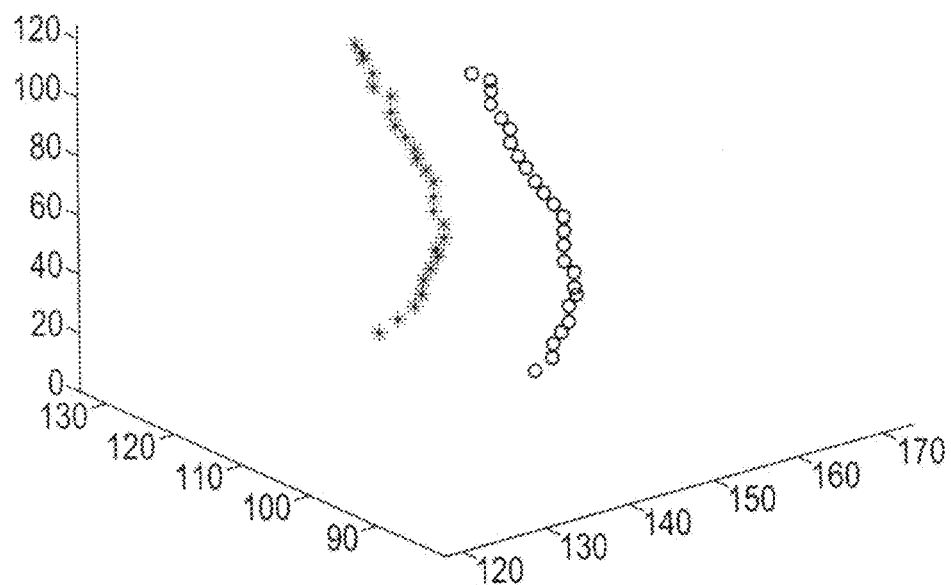
FIG. 9 is a plot of two sets of vessel center points before initial alignment.
Figure 10:
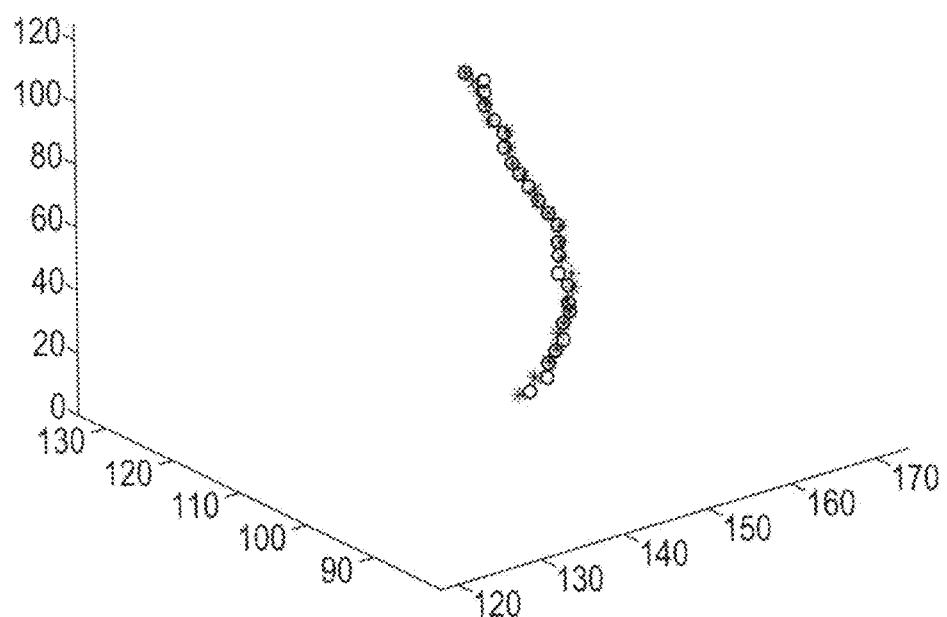
FIG. 10 is a plot of two sets of vessel center points after initial alignment.

FIG. 9 is a plot of the vessel center points (which may also be referred to as the region of interest center points) in the first set of image data and the vessel center points in the second set of image data, before initial alignment is performed. The vessel center points in the first set of image data are represented as stars and the vessel center points in the second set of image data are represented as circles. FIG. 10 is a plot of the vessel center points after the initial alignment, showing that the points are substantially, but not perfectly, overlaid.

In further embodiments, the registration unit 28 matches the vessel center points using any other suitable method.

In another embodiment, the initial alignment is an initial coarse registration of the subset of the first image data and the subset of the second image data using any suitable registration method. Each subset is downsampled to a lower resolution than its native resolution and a rigid registration is performed on the downsampled subsets.

In further embodiments, any suitable method may be used to perform the initial alignment of the first set of image data and the second set of image data.

The initial alignment finds the approximate transformation that best aligns the two sets of image data. In the present embodiment, that transformation is a rigid transformation comprising translation and rotation. The registration unit 28 then transforms the subset of the second set of image data according to the transformation resulting from the initial alignment, to give a transformed subset of the second set of image data. The remainder of the second set of image data that is not part of the subset is not transformed at this stage. In other embodiments, the subset of the first set of image data is transformed and the none of the second set of image data is transformed. In further embodiments, all of the second set of the image data is transformed, or all of the first set of image data is transformed. Transformation of the entire set of data may requires more computational resource than the transformation of the subset.

Constraints may be placed on the initial alignment. In the present embodiment, a search space is defined that is based on the size of the aorta, limiting the allowed translation to half the aorta diameter. The allowed translation limit is set as a pre-determined value in the registration unit 28. An arbitrary limit on rotation is set as a pre-determined value in the registration unit 28. In other embodiments, the limits on translation and rotation may be selected by the user or may be calculated by the registration unit 28 by reference to any information that has already been obtained from the sets of image data.

At stage 54, the registration unit 28 refines the initial alignment of the first set of image data and the second set of image data by performing a rigid registration at full resolution of the subset of the first set of image data and the transformed subset of the second set of image data. This refinement may be considered to be an optimization of the transformation of the subset. In the present embodiment, the rigid registration comprises an intensity-based registration with a mutual information metric. The rigid registration results in a rigid transformation which comprises translation and rotation. The rigid transformation may be considered to be the optimal transformation of the subset. Once the rigid transformation of the subset is determined, the transformation of the full image data set can be calculated directly with the location of the subset within the full image data set. The rigid transformation is applied to the transformed second set of image data to give a final second set of image data.

In the present embodiment, the initial alignment and rigid registration are performed on the volumetric region of interest, which comprises the tubular structure (in this embodiment, the aorta) plus any other tissue that is included in the planar regions of interest (which in this embodiment are square. Neither the initial alignment nor the rigid registration is performed on a segmented vessel. At no point is a full segmentation of the vessel performed.

Figure 11:
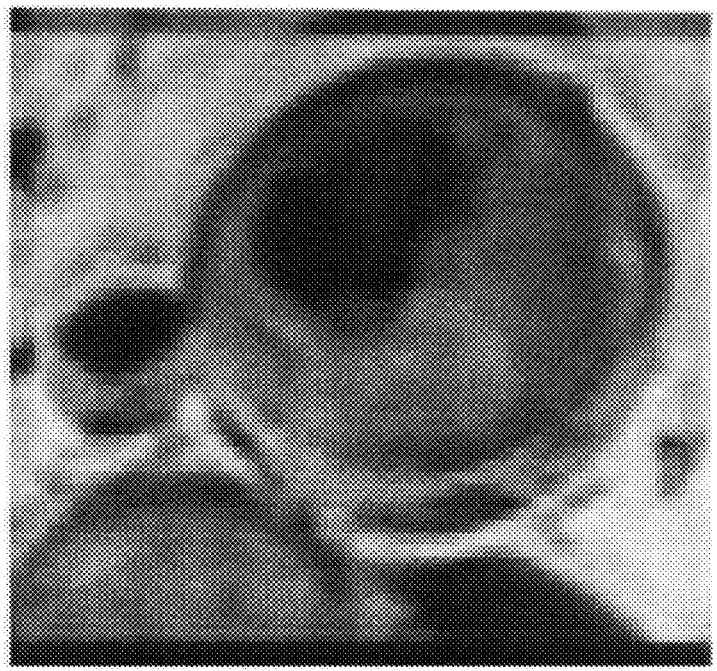
FIG. 11 shows a pair of overlaid images on which an initial alignment has been performed.
Figure 12:
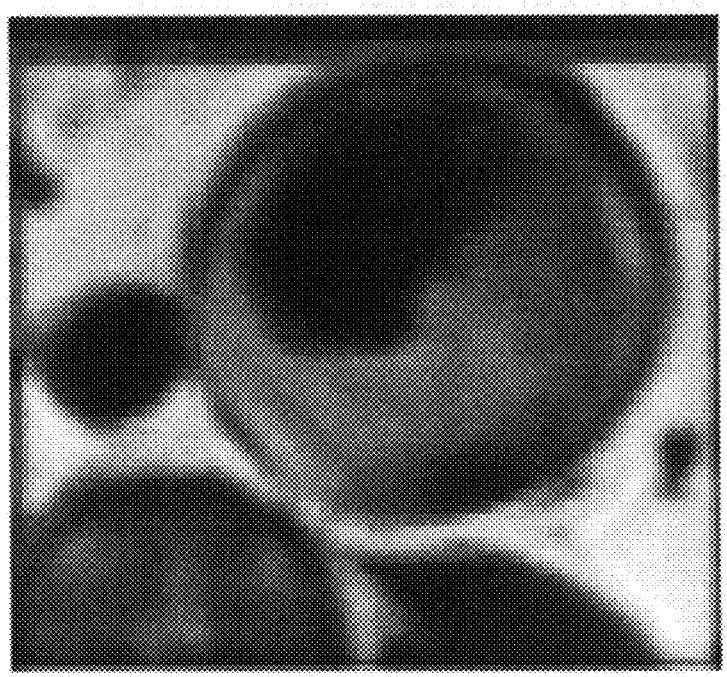
FIG. 12 shows a pair of overlaid images on which initial alignment and refinement by rigid registration has been performed.

FIG. 11 shows a pair of overlaid images on which an initial alignment has been performed. FIG. 12 shows the same pair of images for which the initial alignment has been refined by rigid registration, giving an improved alignment.

In the present embodiment, no constraints are made on the rigid registration at full resolution. It has been found that the constraints on the initial alignment are enough to ensure that the rigid registration is adequately constrained. In alternative embodiments, constraints may be put on the rigid registration, for example limits on the translation or rotation.

The first set of image data and the transformed set of image data may be displayed on display screen 16. Any suitable means of distinguishing the first set of image data and the transformed set of image data in the resulting image may be used. For example, the images may be displayed in different colors. In one embodiment, the first set of image data is displayed colored in red, and the transformed set of image data is displayed colored in blue.

Any appropriate method may be used for the rigid registration. Although in the present embodiment the rigid registration is performed at full resolution (the original resolution of the image data), in alternative embodiments a different resolution may be used.

By starting from image data that has been roughly aligned by the initial alignment, the registration may be much faster than if it was performed on data for which no initial alignment had taken place. Additionally, the use of the initial alignment of stage 52 may mean that local minima may be avoided.

Performing the initial alignment and the rigid registration of the subset of each image data set that corresponds to the volumetric region of interest, rather than the entire image data set, may require less computational resources than if these processes were performed on the entire data set. Transformation of the whole set of image data may only be calculated as an output of the process when necessary, and may not be performed during the optimization of the registration.

In the present embodiment, is necessary to limit the non-rigidity of the registration. The process of FIG. 2 applies strictly rigid registration (translation and rotation only) to the aorta by calculating the required transform using only the aorta and its immediate surroundings. The aorta itself is substantially rigid, because of the blood pressure in the aorta. The aneurysm itself may also be somewhat rigid, because it contains solid thrombus and some calcification. If non-rigid registration is included in the registration process of stage 54, it is likely that any changes in the aneurysm between the first set of image data and the second set of image data may not show up in the registered image. Tissue represented by the first medical image data and the second medical image that is not part of the aorta or the aneurysm may be less rigid than the aorta or the aneurysm. Tissue that is not part of the aorta or the aneurysm may be substantially non-rigid.

Figure 13:
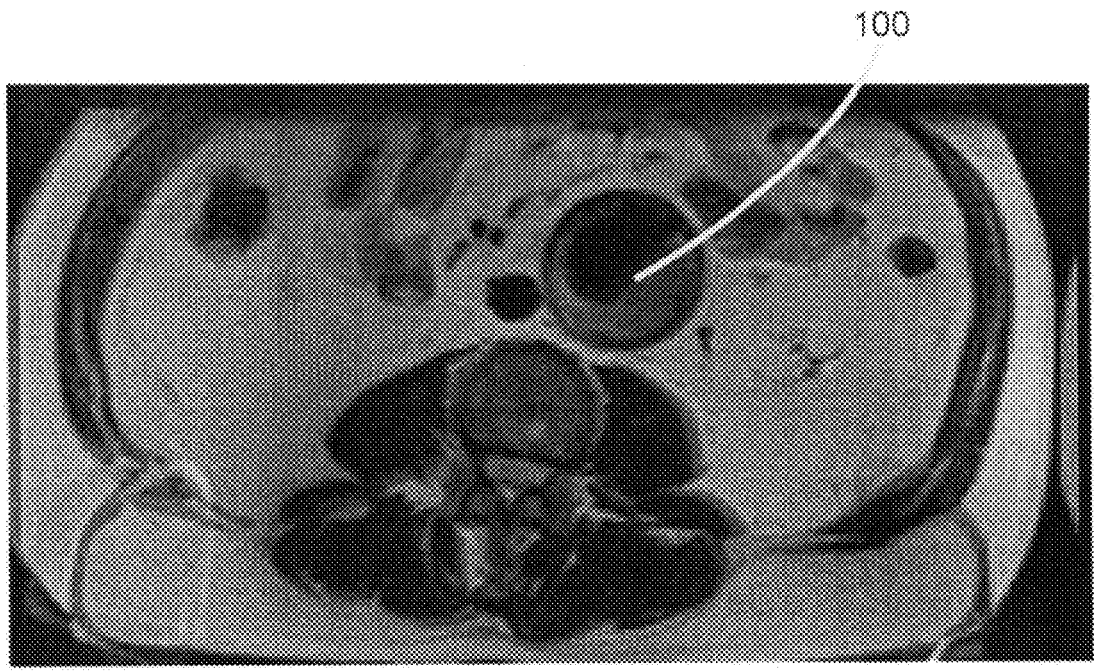
FIG. 13 is an overlaid image of two sets of registered image data.

FIG. 13 is an overlaid image of a first set of image data and final second set of image data showing the aorta 100. The first set of image data is the reference data and the second set of image data is the floating data. It may be seen that while the aorta itself is well registered, as it is intended to be, other parts of the anatomy show relative movement between the images.

By restricting the registration to the subsets of the image data, which correspond to the region of interest around the aorta, the non-rigid material in the rest of the scan is excluded from the registration. It may be seen from FIG. 13 that the non-rigid material is not well-registered. This is acceptable since the aim of the process of FIG. 2 is to register the aorta and good registration of other parts of the anatomy is not required.

It may be noted that the aim of the registration is the retention of clinically relevant information, for example, the imaging of changes in the aneurysm. It is important that such clinically relevant information is not registered away. Therefore the final image comparison as shown in FIG. 13 may not represent the best registration as would be assessed by image processing criteria. Matching the images exactly is not desirable in this case. The important aspect is to match the aorta but to let the aneurysm change. It is acceptable to let other parts of the anatomy move. The process of FIG. 2 has a different outcome from some known commercial registration packages, which would not be able to register the main part of the aorta while letting the aneurysm change.

Figure 14:
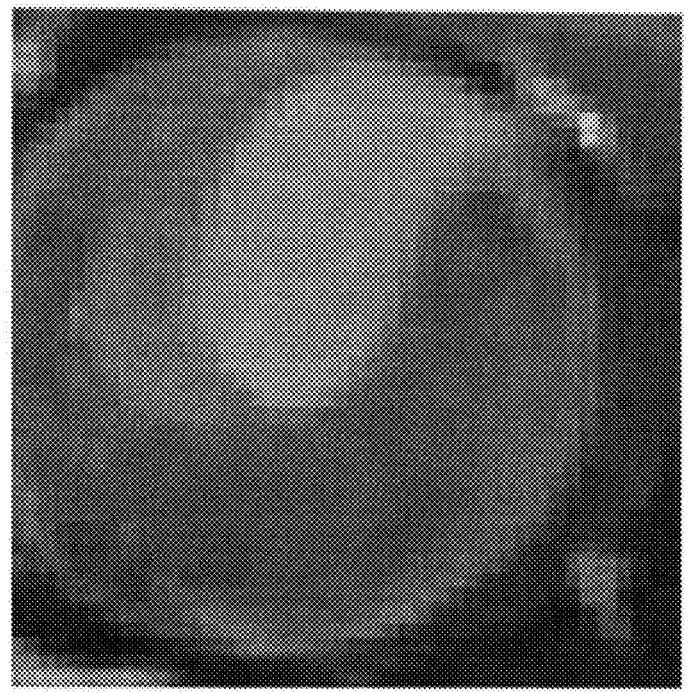
FIG. 14 is an overlaid image of CT and MR data before registration.
Figure 15:
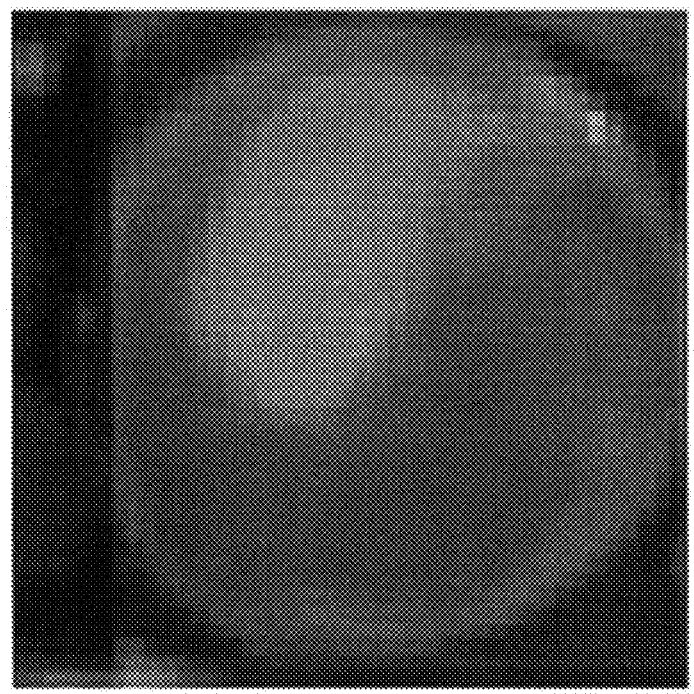
FIG. 15 is an overlaid image of CT and MR data after registration.

FIGS. 14, 15, 16 and 17 show further overlaid images, each representing a first set of image data and a second set of image data and each focusing on the aorta. FIGS. 14 and 15 show images in which the first set of image data is CT data and the second set of image data is MR data. FIG. 14 shows a matching pair of unregistered CT and MR images. FIG. 15 shows the same pair of images after registration.

Figure 16:
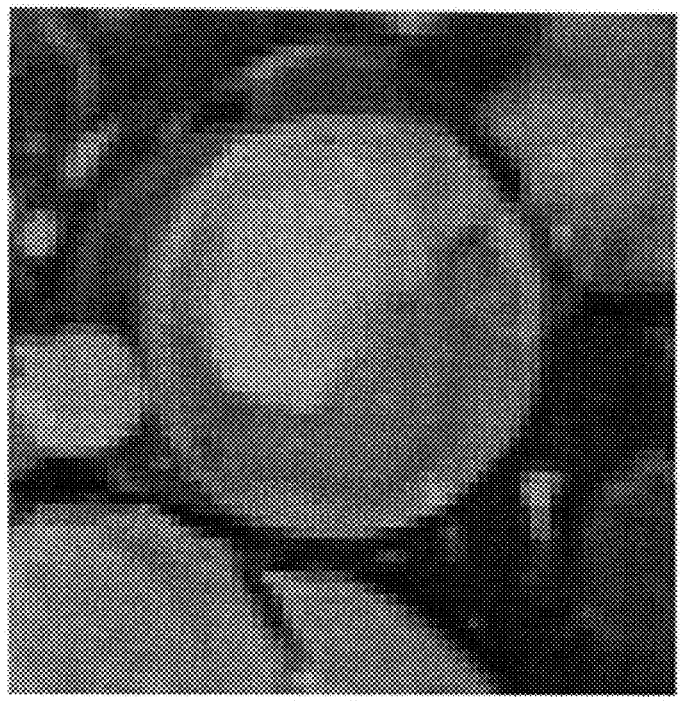
FIG. 16 is an overlaid image of two sets of CT data before registration.
Figure 17:
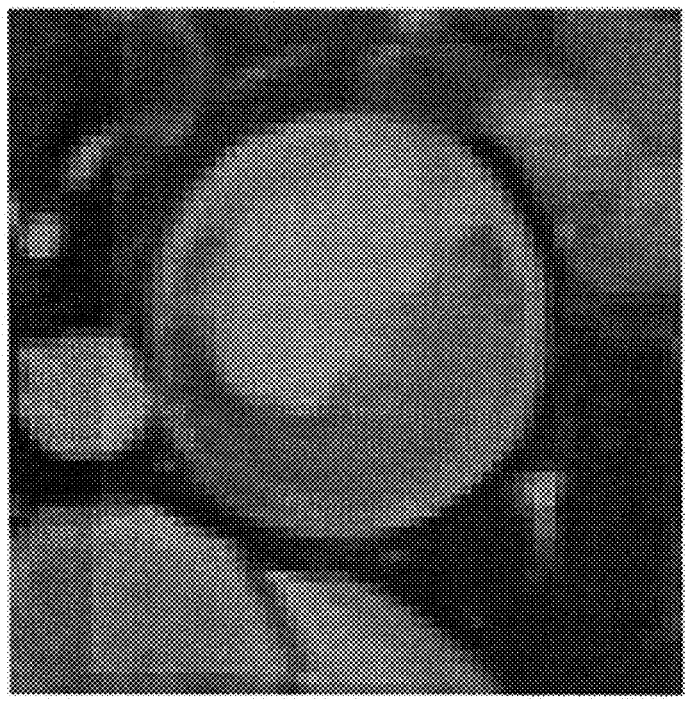
FIG. 17 is an overlaid image of two sets of CT data after registration.

FIGS. 16 and 17 show images in which the first set of image data and the second set of image data both comprise MR data. FIG. 16 shows the images before registration and FIG. 17 shows the images after registration.

In further embodiments, the initial alignment of stage 52 and/or the registration of stage 54 may include scaling. The initial alignment of stage 52 and/or the registration of stage 54 may comprise an affine registration. In other embodiments, the heart may be the tubular structure of interest. One application of registration of the heart is to monitor subtle changes in MR between an image with a contrast agent and an image without a contrast agent. The success of the comparison may be dependent on the phase of the heart. It may be necessary to include a non-rigid aspect to the registration.

In further embodiments, the thoracic aorta may be the tubular structure of interest. The thoracic aorta is very pulsatile. It may be necessary to use image gating to image the vessel when relaxed. Alternatively or in addition, some element of non-rigid registration may be required. In additional embodiments, image gating may be used in obtaining images of any tubular structure.

In the present embodiment, an approximate match is obtained by an iterative closest point search on the region center points (stage 52) followed by refinement at full resolution (stage 54).

In further embodiments, stage 52 is omitted and the rigid (or affine) registration of stage 54 is performed directly on the regions of interest that were identified in step 50. Omitting stage 52 may result in that the process being considerably slower than when stage 52 is included. For example, performing the initial rough alignment of stage 52 followed by the rigid registration of stage 54 may be 100 times faster than performing the rigid registration at full resolution without an initial alignment.

In alternative embodiments, the registration unit 28 assesses the quality of alignment that is achieved by the initial alignment. If the initial alignment has achieved very good alignment between the first set of image data and the second set of image data, no rigid registration is performed at stage 54 and the result of the initial alignment may be used to produce an image for display on display screen 16.

In the present embodiment, a volumetric region of interest and corresponding subset of image data are determined for each of the first set of image data and the second set of image data. However, in alternative embodiments, a volumetric region of interest and subset may be defined only for one of the sets of image data. For example, in some embodiments a volumetric region of interest is defined on the first set of image data, and a corresponding subset is determined for the first set of image data. No volumetric region of interest is defined for the second set of image data, and the subset of the first set of image data is registered with the entire second set of image data In the present embodiment, a planar regions of interest is defined on each of a plurality of two-dimensional slices that are obtained from a CT scan. Each slice is taken in a plane that is substantially perpendicular to the tubular structure that is being imaged (the aorta). In alternative embodiments, the slices on which planar regions of interest are defined may not be the image slices. Instead, a set of slices may be constructed from the image data set in which the slices are at an angle to the original scan axis. For example, in one embodiment the tubular structure is neither parallel or perpendicular to the image slices, but instead lies at an angle. For each image data set, a second set of slices is defined that lie at an angle to the image slices, for example at an angle such that each of the second set of slices is substantially perpendicular to the length of the tubular vessel. For each data set, an initial seed point is identified on one of the second set of slices and the process of FIG. 2 is carried out as described above but using the second set of slices rather than the slices that were obtained in the original scan. The process of FIG. 2 has been prototyped on registration of image data for the abdominal aorta which was obtained from clinical trials. It was found that the process of FIG. 2 took approximately two minutes of the clinician's time, plus at most 15 minutes to perform the automatic steps of the process. This compares favorably to manual registration procedures, in which the clinician registers each slice of the image manually. Manual registration performed slice by slice was found to take between 40 and 50 minutes for the same image data. Therefore the process of FIG. 2 may save time and make the use of the clinician's time more efficient. The process of FIG. 2 may be used in rapid follow-up where the changes in the tubular structure of interest, for example the change in size of an aneurysm, are small or moderate. The effectiveness of the process of FIG. 2 may depend on the correct data being acquired.

Certain embodiments also provide a method for registering tubular structures in a pair of medical datasets, comprising obtaining a seed point within a lumen of each dataset, centering of each seed point within the lumen, propagating a region centered on the seed points to neighboring slices, discovering a spatial transformation to best match the two sets of points, refinement using full resolution intensity-based registration with mutual information metric, operating with the obtained ROI. The method may be applied to single or multimodality image pairs (i.e. CT/CT, CT/MR, different MR sequences, or with/without contrast agent). The method may be applied where the tubular structure of interest is the abdominal aorta. The centering may use a circular Hough transform. The discovering of the spatial transformation may comprise use of an iterative closest point algorithm.

The process of FIG. 2 is expected to be more accurate than a known method which segments the aortas in both images and then registers the resulting binary objects. The process of FIG. 2 includes a coarse registration phase and a refinement phase that makes use of all the image intensities in the volumetric region of interest. The process of FIG. 2 has been demonstrated to work well for different modalities and between modalities.

The process of FIG. 2 may augment the available options and information for patients whose aneurysms are being monitored. The process of FIG. 2 may assist in providing information by making it easier to combine the results of scans in different modalities.

Although embodiments have been described in relation to the processing of CT data, embodiments may be used to process any suitable type of medical image data, for example X-ray data, MRI data or PET data. Embodiments may register data sets having the same modality, or data sets having different modalities.

Whilst particular units have been described herein, in alternative embodiments functionality of one or more of these units can be provided by a single unit, processing resource or other component, or functionality provided by a single unit can be provided by two or more units or other components in combination. Reference to a single unit encompasses multiple components providing the functionality of that unit, whether or not such components are remote from one another, and reference to multiple units encompasses a single component providing the functionality of those units. Whilst certain embodiments have been described, these embodiments have been presented by way of example only, and are not intended to limit the scope of the invention. Indeed the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. An apparatus for registering medical image data representing a tubular structure, comprising:
   processing circuitry configured to
      obtain first medical image data representing the tubular structure and second medical image data representing the tubular structure, the first medical image data including a plurality of slices and the second medical image data including a plurality of slices
      identify the tubular structure in the first medical image data,
      define in the first medical image data a volumetric region of interest comprising the tubular structure along at least part of the length of the tubular structure,
      define a subset of the first medical image data corresponding to the volumetric region of interest,
      match the tubular structure in the subset between the neighboring slices, track a seed point in the neighboring slices based on the matched tubular structure, and perform a registration of the subset of the first medical image data with at least some of the second medical image data based on the tracked seed points, wherein the registration comprises at least one of a rigid registration and an affine registration.

2. The apparatus according to claim 1, wherein the processing circuitry defines the volumetric region of interest by defining a plurality of planar regions of interest, and wherein the volumetric region of interest comprises the plurality of planar regions of interest.

3. The apparatus according to claim 2, wherein the first medical image data comprises a plurality of slices and each planar region of interest is defined on a respective one of the plurality of slices.

4. The apparatus according to claim 2, wherein the processing circuitry defines a planar region of interest on a slice by performing a matching procedure between the slice and an adjacent slice.

5. The apparatus according to claim 4, wherein the matching procedure comprises at least one of rigid registration or affine registration.

6. The apparatus according to claim 3, wherein the processing circuitry defines the volumetric region of interest by, for each image slice, determining a respective point within the tubular structure and defining the respective planar region of interest with respect to the respective point.

7. The apparatus according to claim 1,
wherein the processing circuitry is further configured to define in the second medical image data a further volumetric region of interest,
wherein the processing circuitry defines the volumetric region of interest in the first medical image data by determining a first set of points along the length of the tubular structure in the first medical image data, and
wherein the processing circuitry defines the further volumetric region of interest in the second medical image data by determining a second set of points along the length of the tubular structure in the second medical image data.

8. The apparatus according to claim 7, wherein the processing circuitry is configured to determine each of the first set of points by identifying a seed point in a slice of the first medical image data and propagating the seed point to a series of further slices, and to determine each of the second set of points by identifying a seed point in a slice of the first medical image data and propagating the seed point to a series of further slices.

9. The apparatus according to claim 7, wherein the processing circuitry is further configured to perform an initial alignment of the first medical image data and the second medical image data, and wherein performing the initial alignment comprises aligning the first set of points with the second set of points.

10. The apparatus according to claim 9, wherein performing the initial alignment comprises aligning the first set of points with the second set of points using an iterative closest point algorithm.

11. The apparatus according to claim 1, wherein the processing circuitry is further configured to define in the second medical image data a further volumetric region of interest comprising the tubular structure along at least part of the length of the tubular structure and to define a subset of the second medical image data corresponding to the further volumetric region of interest.

12. The apparatus according to claim 11, wherein the processing circuitry performs a registration of the subset of the first medical image with at least some of the second medical image data by performing a registration of the subset of the first medical image data with the subset of the second medical image data.

13. The apparatus according to claim 1, wherein the processing circuitry is further configured to perform an initial alignment of the first medical image data and the second medical image data, and wherein the registration of the subset of the first medical image data with at least some of the second medical image data comprises refining the initial alignment of the first medical image data and the second medical image data.

14. The apparatus according to claim 1, wherein at least one of the first medical image data and the second medical image data further represents tissue that is not part of the tubular structure, and wherein the tubular structure is more rigid than at least some of the tissue that is not part of the tubular structure.

15. The apparatus according to claim 1, wherein the processing circuitry defines the volumetric region of interest by determining a seed point within a lumen of the tubular structure and defining the volumetric region of interest with respect to the seed point.

16. The apparatus according to claim 15, wherein the processing circuitry defines the volumetric region of interest by centering the seed point within the lumen of the tubular structure.

17. The apparatus according to claim 1, wherein the tubular structure is identified using at least one of a circular Hough transform, a probability density model, a blob feature detection method, an edge detection method, a genetic algorithm, a classifier, a feature detection method.

18. The apparatus according to claim 16, wherein the seed point is centered using at least one of a circular Hough transform, a probability density model, a blob feature detection method, an edge detection method, a genetic algorithm, a classifier, a feature detection method.

19. The apparatus according to claim 1, wherein the processing circuitry is further configured to perform an initial alignment of the first medical image data and the second medical image data, wherein the registration of the subset of the first medical image data with at least some of the second medical image data is performed at a higher resolution than the resolution at which the initial alignment is performed.

20. The apparatus according to claim 1, wherein the processing circuitry performs the registration by performing a registration based on a mutual information metric.

21. The apparatus according to claim 1, wherein the first medical image data is of a different imaging modality to the second medical image data.

22. The apparatus according to claim 1, wherein the tubular structure comprises at least one of: the abdominal aorta, the heart, the thoracic aorta.

23. The apparatus according to claim 1, wherein the tubular structure comprises at least one of an aneurysm, a region of plaque, a region of stenosis.

24. The apparatus according to claim 1, wherein each of the first medical image data and the second medical image data comprises at least one of: CT data, MR data, PET data, SPECT data, X-ray data.

25. A method for registering medical image data representing a tubular structure, comprising:
obtaining first medical image data representing the tubular structure;

obtaining second medical image data representing the tubular structure, the first medical image data including a plurality of slices and the second medical image data including a plurality of slices;

identifying the tubular structure in the first medical image data;

defining in the first medical image data a volumetric region of interest comprising the tubular structure along the length of the tubular structure;

defining a subset of the first medical image data corresponding to the volumetric region of interest;

matching the tubular structure in the subset between the neighboring slices;

tracking a seed point in the neighboring slices based on the matched tubular structure; and registering the subset of the first medical image data with at least some of the second medical image data based on the tracked seed points, wherein the registration comprises at least one of a rigid registration and an affine registration.

26. A non-transitory computer-readable storage medium storing a computer program for performing a method according to claim 25.

* * * * *